United States Patent [19]

Hettler et al.

[11] Patent Number: 5,344,127
[45] Date of Patent: Sep. 6, 1994

[54] SWITCHABLE BEARING

[75] Inventors: Werner Hettler, Mannheim; Arnold Simuttis, Bad Kreuznach, both of Fed. Rep. of Germany

[73] Assignee: Firma Carl Freudenberg, Weinheim/Bergstr., Fed. Rep. of Germany

[21] Appl. No.: 988,546

[22] Filed: Dec. 10, 1992

[30] Foreign Application Priority Data

Dec. 14, 1991 [DE] Fed. Rep. of Germany ....... 4141332

[51] Int. Cl.⁵ .............................................. F16F 5/00
[52] U.S. Cl. ................................. 267/140.13; 267/219
[58] Field of Search ...................... 267/140.12, 140.13, 267/140.14, 267, 219, 35; 248/562, 636; 180/300, 312

[56] References Cited

U.S. PATENT DOCUMENTS

| | | | |
|---|---|---|---|
| 4,653,734 | 3/1987 | Jordens | 267/219 |
| 4,660,812 | 4/1987 | Dan et al. | 267/140.13 |
| 4,700,931 | 10/1987 | Eberhard et al. | 267/140.13 |
| 4,834,350 | 5/1989 | de Fontenay | 267/140.13 |
| 4,886,251 | 12/1989 | Hausserman | 267/140.13 |
| 4,901,986 | 2/1990 | Smith | 267/140.14 |
| 4,921,049 | 5/1990 | Kaiser et al. | 267/140.13 |
| 5,092,566 | 3/1992 | Freudenberg | 267/140.14 |
| 5,102,105 | 4/1992 | Hamaekers et al. | 267/140.13 |
| 5,145,156 | 9/1992 | Muramatsu et al. | 267/140.14 |

FOREIGN PATENT DOCUMENTS 3940004 6/1991 Fed. Rep. of Germany ...... 180/300

Primary Examiner—Robert J. Oberleitner
Assistant Examiner—Chris Schwartz
Attorney, Agent, or Firm—Kenyon & Kenyon

[57] ABSTRACT

A switchable bearing is disclosed which comprises a cup-shaped housing sealed by an annular spring element of an elastomeric material. Between the spring element and the housing base is a separating wall, which has at least one flow-through opening and which, together with the spring element, delimits a working chamber and, together with the housing, delimits a compensating chamber. The working chamber and the compensating chamber communicate through the flow-through opening and are filled with a hydraulic fluid. The flow-through opening is sealed by a piston of a control unit, arranged at least partially in the compensating chamber. The piston is actuated by a pressurized medium, and is connected in a gastight and relatively movable manner to an aneroid chamber, which is rigidly mounted in the housing and is capable of being charged with a pressurized medium. The aneroid chamber is delimited by a flexible first ring diaphragm, which seals off the piston and the aneroid chamber from the housing.

15 Claims, 7 Drawing Sheets

SWITCHABLE BEARING

The instant invention relates to a switchable bearing with a cup-shaped housing, sealed by an annular spring element of an elastomeric material. In this bearing, between the spring element and the bottom of the housing, is a separating wall which has at least one flow-through opening. The wall and the spring element delimit a working chamber. The wall and the housing delimit a compensating chamber. The working chamber and the compensating chamber communicate through the flow-through opening and are filled with a hydraulic fluid. The flow-through opening is sealed by a piston of a control unit. The piston is arranged at least partially in the compensating chamber and is actuated by a pressurized medium. The control unit can contain an aneroid chamber, used to contain the pressurized medium.

One type of bearing is disclosed in European Published Patent Application 0 173 273. In this bearing, a connecting port which is arranged centrally within the separating wall is opened or sealed, as needed, by a sealing plate. To achieve the best possible damping action, the connecting port in the separating wall is sealed by the plate, and the compensating chamber and the working chamber communicate with one another only via a throttle duct. To improve the isolation of high-frequency vibrations, the sealing plate opens the perforation in the separating wall. This bearing, however, requires a separate actuating means in the form of a pneumatic cylinder. This feature is not very satisfactory in that it increases the size of the bearing, is less economical and can be difficult to produce.

The object of the instant invention is to provide a bearing which is more compact, which uses a simpler type of construction, and is more cost-effective to produce than the above-described bearing, while achieving good damping of low-frequency vibrations and excellent insulation of high-frequency vibrations.

In the instant switchable bearing, a piston is provided, in a gastight and relatively movable manner, within an aneroid chamber. The aneroid chamber is rigidly mounted in the housing and is charged with a pressurized medium. The aneroid chamber is delimited by a first ring diaphragm, which is flexible and which seals off the piston and the aneroid chamber from the housing. It is advantageous if this control unit is integrated into the bearing housing. The bearing has a simple design, and all the required control unit subassemblies can be produced together with the bearing subassemblies. To reduce resonance, the bearing and the control servo unit should have the lowest possible true specific weight. The comparatively simple actuation of the control servo unit, as well as its compact dimensions and its low weight, make the bearing according to the present invention suitable for a wide range of applications, such as an engine suspension mount in inexpensive motor vehicles.

The aneroid chamber in the present invention is provided with a pneumatic connection and, depending on the prevailing conditions, is charged with overpressure or a partial vacuum. Charging with overpressure is advantageous when machine elements that border on the bearing, such as hydraulic cylinders, are already being charged with overpressure and are connected to a pressure-distribution device. Charging the aneroid chamber with a partial vacuum can be advantageous, in motor vehicles equipped with Otto (spark ignition) engines, since a partial vacuum is readily available from the intake manifold or from an accumulator connected to the intake manifold.

In an advantageous refinement, the piston is surrounded in a fluid-tight manner by a second ring diaphragm. The second ring diaphragm is a roller diaphragm which, together with the separating wall, defines the compensating chamber. This refinement guarantees substantially nonpressurized flow of liquid components from the working chamber to the compensating chamber as well as good durability, a long service life, and other good working properties.

In the vicinity of the piston, the roller diaphragm can have a plug-type bulb which is premolded in one piece and can engage, as needed, the flow-through opening of the separating wall. This one-piece configuration ensures comparatively simple production and tight connections between the parts. It is advantageous that when movement of the plug-type bulb is stopped at the separating wall when the bulb seals the flow-through opening, the bulb does not cause any impact noises which could be propagated to the attached subassembly. To further reduce the impact shocks or noises, the flow-through opening and/or the plug-type bulb can be designed to facilitate a gradual sealing action.

Improvement in the isolation of higher-frequency vibrations is attained when the separating wall is constructed in two parts, with one of the parts having an open-worked or perforated latticed form surrounding an annular membrane. Bearings designed in this manner insulate high-frequency, small-amplitude vibrations, even when the plug-type bulb seals the flow-through opening through the separating wall. The functioning of this type of bearing is comparable to hydrobearings. By releasing the flow-through opening in the separating wall, the damping in the low-frequency range can be turned off, and a quench effect can be adjusted, for example in the range of between 20 and 100 Hz.

The separating wall can delimit a damping duct, which has an annular shape and which effects a good damping of low-frequency, large-amplitude vibrations.

According to one advantageous refinement, the piston is sealingly surrounded in one area by at least one annular push-action spring of a rubber-elastic material. The push-action spring is braced against an abutment, which is fixed in relation to the housing. An effect of the push-action spring, which acts as a resetting spring, is that the aneroid chamber only has to be pressurized in one operating state. Thus, it is possible for the push-action spring to drive the piston in the non-pressurized state toward the flow-through opening in the separating wall, to seal or release this feed-through opening.

To enable the bearing according to the invention to be manufactured in the simplest possible way, the roller diaphragm and the bulb, as well as the push-action spring can be designed in one piece.

To improve service life, the roller diaphragm and/or the push-action spring can be reinforced with fabric. This is particularly useful in the areas in which the thickness of the material varies considerably, for example in the transition region between the roller diaphragm and the plug-type bulb, and in the transition region between the mounting support for the roller diaphragm between the separating wall and the housing and the thinly constructed boundary wall.

Stop buffers can be allocated to the piston and/or to the housing base to limit extreme deflections of the piston in relation to the housing. Another advantage of the stop buffers is that the push-action spring and the stop buffers function together in a way that allows resonant vibrations of the control unit to be reliably avoided. The push-action springs can be configured so as to allow the stop buffers to be axially prestressed when subjected to force, so that they come up against an abutment, which can be a part of the housing.

To guarantee good mobility of the control unit in the axial direction and the lowest possible actuating forces, the cavity formed between the roller diaphragm and the aneroid chamber is provided with at least one vent port that is open to the atmosphere.

The subject matter of the present invention is described with reference to the attached drawings.

Figure 1:
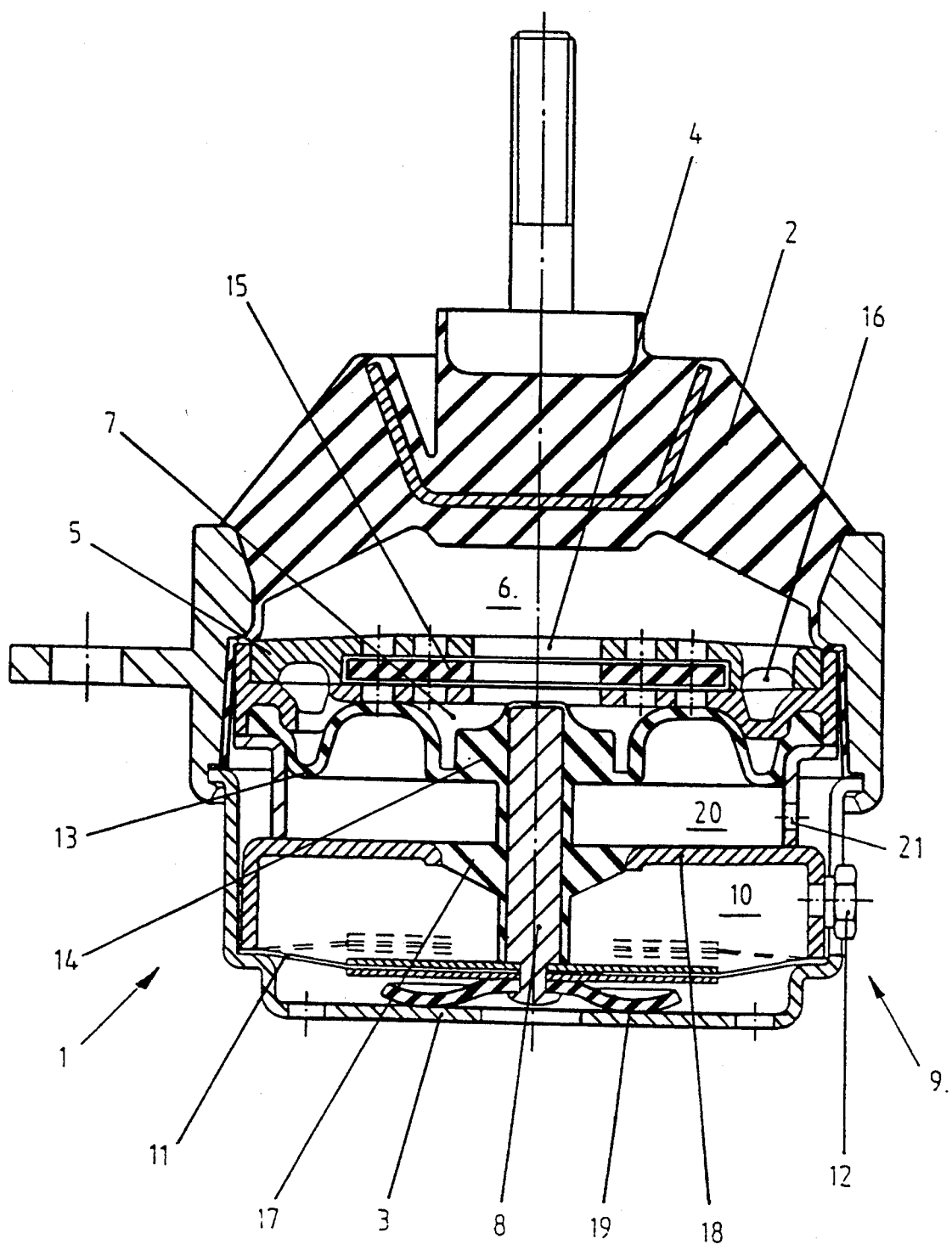
FIG. 1 shows a cross-sectional view of a first embodiment of the present invention.

The bearings depicted in FIGS. 1 through 7 can be used as engine bearings. The switchable bearings comprise a cup-shaped housing 1, sealed by an annular spring element 2. Inside the bearing is a separating wall 5, which has one flow-through opening 4. Together with the spring element 2, the separating wall 5 delimits a working chamber 6 and together with an adjacent roller diaphragm 13, the separating wall 5 delimits a compensating chamber. The working chamber 6 and the compensating chamber 7 are filled with fluid; water containing a concentration of antifreeze generally is used. The working chamber 6 and the compensating chamber 7 are in fluid communication with one another. An annular damping duct 16, inside the separating wall 5, causes low-frequency, large-amplitude vibrations to be damped, as will be described below. The length and cross-section of the damping duct 16 are adapted for the particular conditions which the bearing will undergo. Adjustment of these dimensions to achieve desired results according to conditions will be apparent to one skilled in the art. A pneumatically-actuated control unit 9 is located inside the bearing 1. Control unit 9 could also be hydraulically actuated; however this method of operation would be more complicated than pneumatic actuation. The separating wall 5 of the bearings according to FIGS. 1 through 7 is designed in two parts in the axial direction, is perforated in a grid-like manner and, in this area, surrounds a circular membrane 15.

The operation of the bearing is as follows. If the flow-through opening 4 in the separating wall 5 is sealed by a plug-like bulb 14, which is connected to a piston 8, the bearing of the present invention works in the manner of an engine and chassis bearing. Such a bearing is adjusted in a well known way, so that low-frequency, large-amplitude vibrations are damped by the displacement of liquid through the damping duct 16, which connects the working chamber and the compensating chamber 7 through a lengthy and small cross-sectioned duct. High-frequency, small-amplitude vibrations are well insulated by means of the axially movable membrane 15 arranged within the separating wall. The bearing can also be switched, by drawing the bulb 14 away from opening 4 via movement of piston 8. Switching the bearing causes the flow-through opening 4 to be opened, so that the damping action in the low-frequency range is turned off. In addition, a quench effect is adjusted, for example, in the range of between 20 and 100 Hz. This function results in an improved isolation of high-frequency vibrations.

In the embodiment of FIG. 1, the bearing is actuated by a partial vacuum. An aneroid chamber 10, provided with a pneumatic connection 12, is connected, for example, to a vacuum accumulator, which communicates through signal transmission with an engine valve timing device of an adjoining internal combustion engine. The configuration shown in FIG. 1 is the bearing of the first embodiment without the application of a partial vacuum. When a partial vacuum is applied, the control unit 9 moves in the direction of the flow-through opening 4 of the separating wall 5. By means of the partial vacuum within the aneroid chamber 10, which is a partial vacuum relative to atmospheric pressure, the piston, which is sealed to a first ring diaphragm 11, moves against the resistance of the push-action spring 17, until the plug-type bulb 14 engages the flow-through opening 4. If a quench effect is needed to isolate vibrations, the opening in the separating wall 5 can be axially lengthened in the manner of a pipe.

Figure 2:
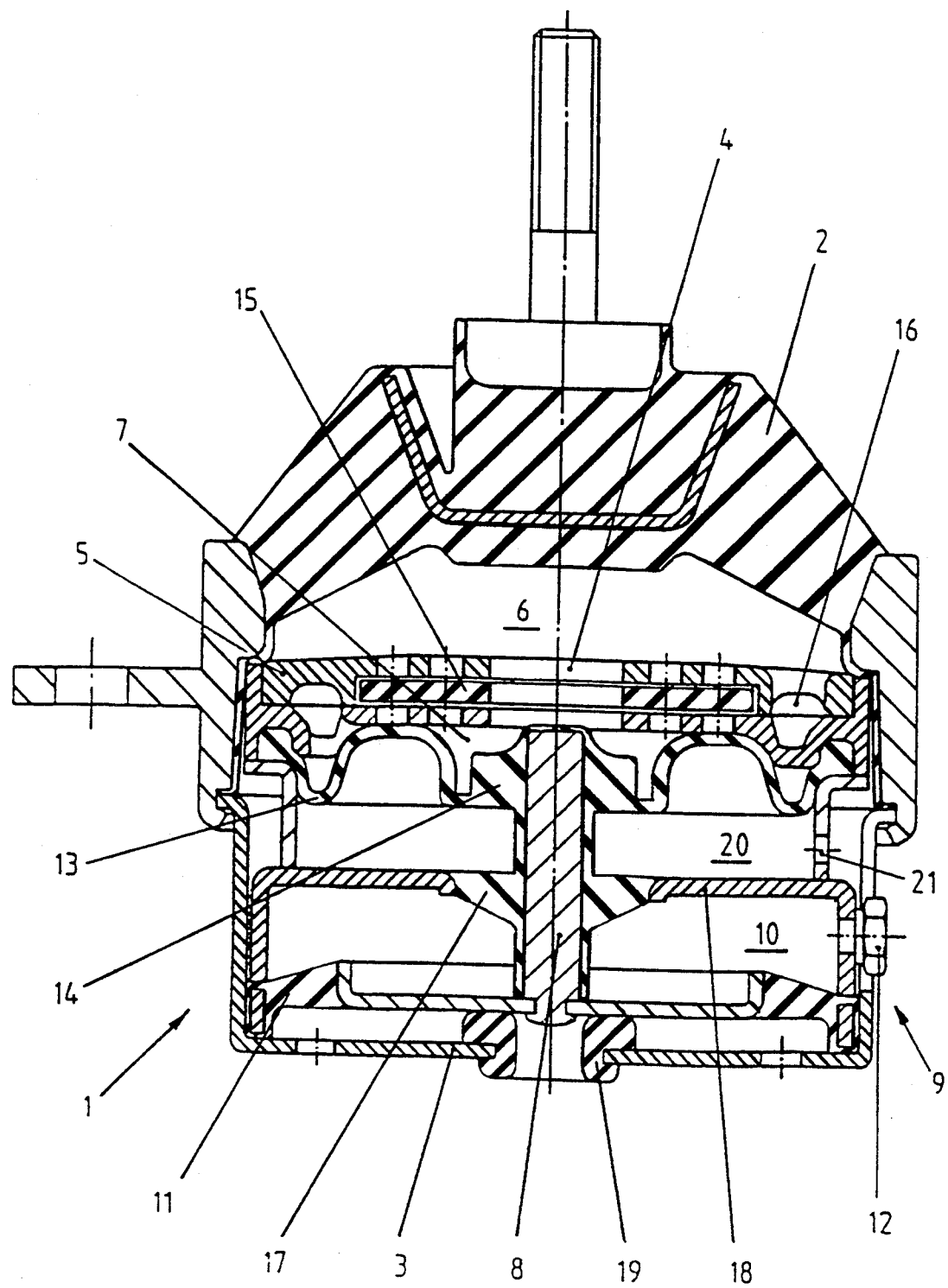
FIG. 2 shows a cross-sectional view of a second embodiment of the present invention.

The bearing according to FIG. 2 functions in essentially the same manner as the bearing shown in FIG. 1. The FIG. 2 bearing differs from the bearing of FIG. 1 in that it contains a first ring diaphragm 11, which is of a different shape but has a flexible design similar to the push-action spring 17. The springs can generally have a more compact design and smaller dimensions. A stop buffer 19 in this embodiment is fastened to the housing base; this feature is advantageous from a standpoint of engineering production.

Figure 3:
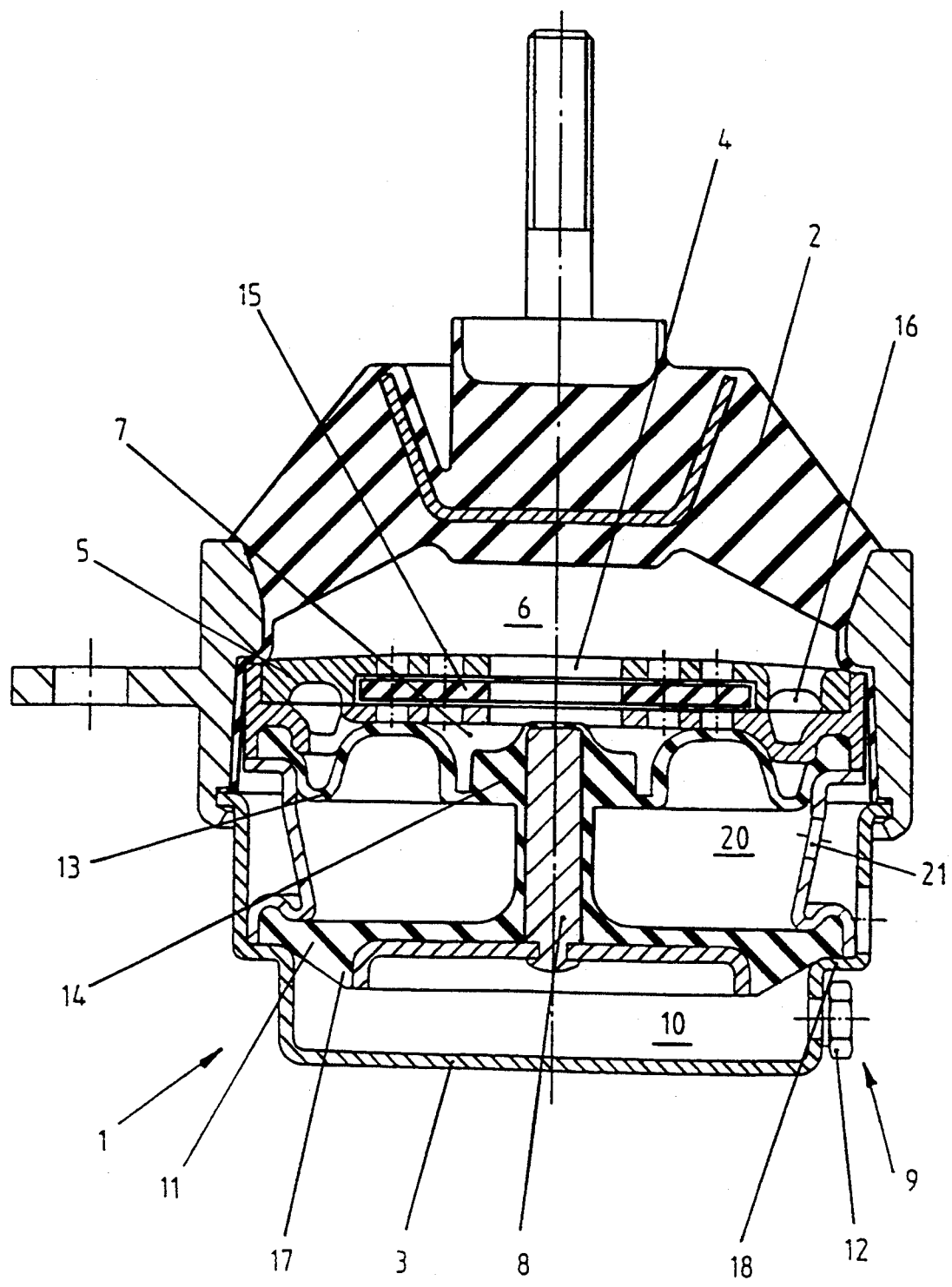
FIG. 3 shows a cross-sectional view of a third embodiment of the present invention.
Figure 4:
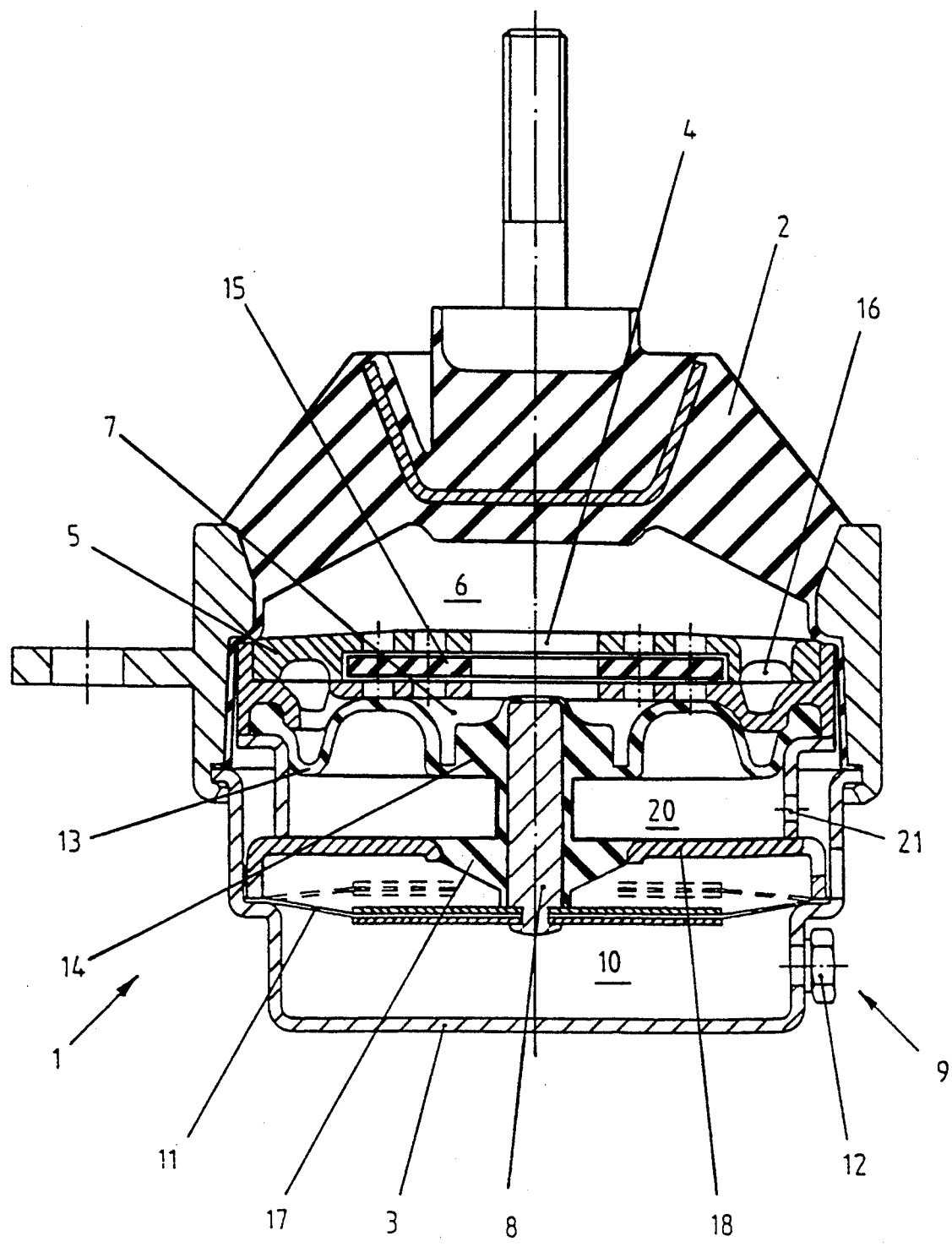
FIG. 4 shows a cross-sectional view of a fourth embodiment of the present invention.

FIGS. 3 and 4 depict bearings according to the invention, with aneroid chambers 10 capable of being charged with overpressure via pneumatic connections 12. In the positions shown here, the push-action springs 17 are in a substantially unloaded state, and the aneroid chambers 10 are not charged with overpressure. When the aneroid chambers 10 are charged with overpressure, the piston 8 moves against the restoring force of the push-action springs 17 in the direction of the flow-through opening 4, until the plug-type bulb 14 sealingly contacts the separating wall 5 in the area of the flow-through opening 4. The function of the bearing at that point is identical to that described above. In FIGS. 1 and 4, the position for the first ring diaphragm 11 when the flow-through opening 4 is closed is shown with dotted lines.

Figure 5:
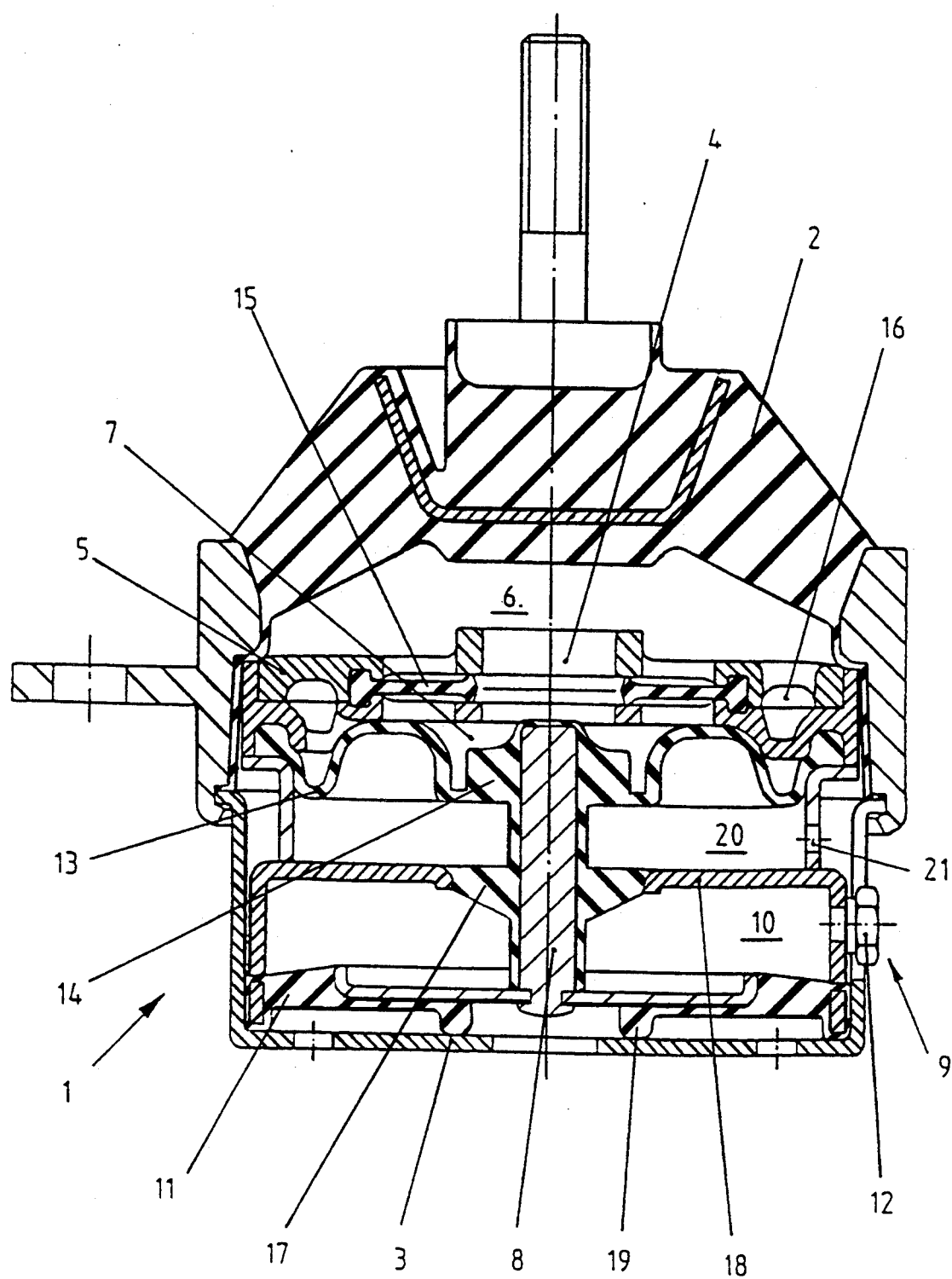
FIG. 5 shows a cross-sectional view of a fifth embodiment of the present invention.
Figure 6:
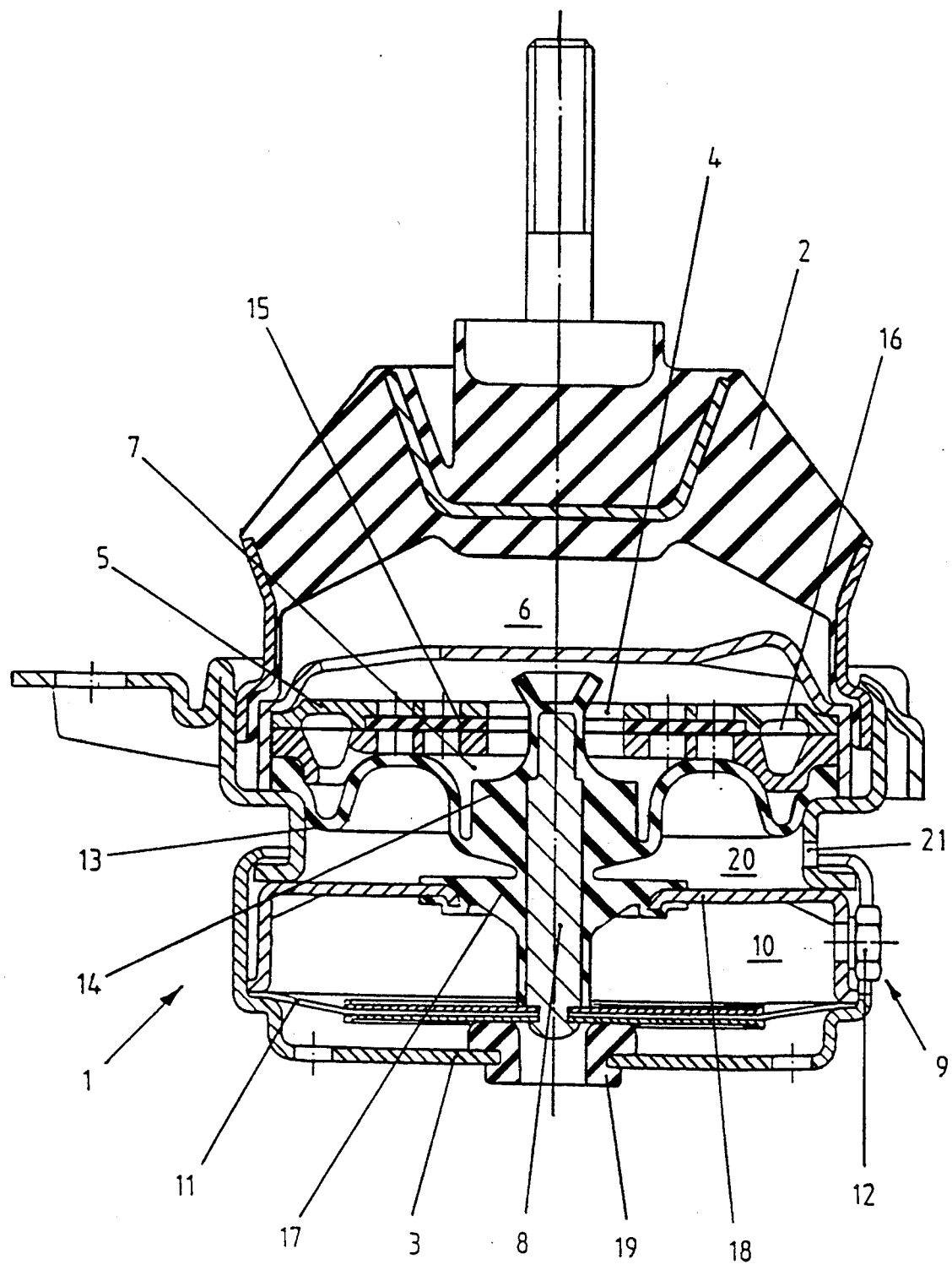
FIG. 6 shows a cross-sectional view of a sixth embodiment of the present invention.
Figure 7:
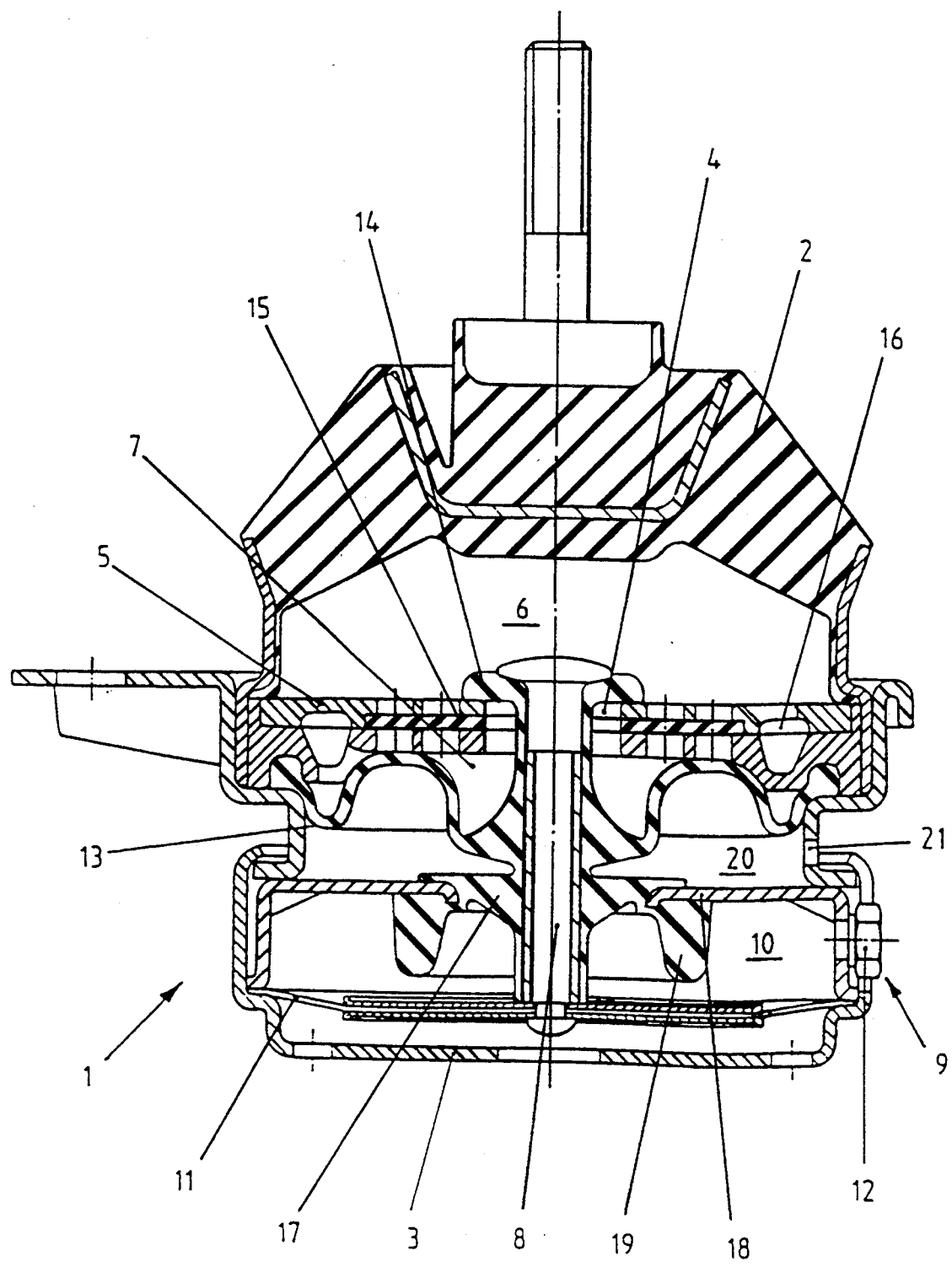
FIG. 7 shows a cross-sectional view of a seventh embodiment of the present invention.

The bearings depicted in FIGS. 5 through 7 are actuated by the application of a partial vacuum. In FIG. 5, the membrane 15 is arranged in the radial direction, on one side under axial prestressing within the separating wall 5, and is bordered with axial clearance in an annular area. This configuration ensures isolation of high-frequency vibrations. To produce a quench effect when the flow-through opening 4 is open, the axial length of the flow-through opening is at most twice the size of its diameter. The first ring diaphragm 11, which in this embodiment is a push-action spring similar to the spring in FIG. 2, is configured in one piece with the stop means 19. The stop means 19 abuts, under light axial prestressing, against the housing base 3 in the open state of the flow-through opening 4. When the aneroid chamber 10 is charged with a partial vacuum, the piston 8 and the plug-type bulb 14 move in the direction of the flow-through opening 4, until it is sealed.

The specific embodiment depicted in FIG. 6 is similar to the specific embodiment of FIG. 1; the stop buffer 19 is fastened to the housing base 3 of the housing 1. In addition to the features previously described, in this embodiment a cup-shaped damping element is configured on the end of the piston 8 nearest the separating wall. This damping element is formed in one piece with the bulb 14, and it damps the axial movement of the piston 8 in the direction of the flow-through opening 4, when it approaches a stop plate arranged in the housing 1. The stop plate also serves as a means for stopping the spring element 2. This refinement of the damping device effects an operation in which the flow-through opening 4 is progressively closed.

In the bearing shown in FIG. 7, in which the aneroid chamber 10 is charged with a partial vacuum, application of the vacuum causes the flow-through opening 4 to open within the separating wall 5. This embodiment is useful when the flow-through opening 4 needs to be opened relatively infrequently. In this embodiment, it is unnecessary for the aneroid chamber 10 to be subjected to a long-lasting application of a partial vacuum. As a result of this configuration, the mode of operation of the bearing is reversed relative to the other described embodiments, and the stop buffers 19 are arranged within the aneroid chamber and restrict the opening movement of the plug-type bulb 14 in the direction of the spring member 2.

We claim:

1. A switchable bearing comprising:
   a cup-shaped housing;
   an annular spring element of an elastomeric material sealing said cup-shaped housing;
   a separating wall between the spring element and the housing, said separating wall having at least one flow-through opening, said separating wall and said spring element delimiting a working chamber, said separating wall and said cup-shaped housing delimiting a compensating chamber, the working chamber and the compensating chamber communicating through the flow-through opening, said working chamber and said compensating chamber being filled with a hydraulic fluid; and
   a control unit, said control unit comprising a piston operative to seal the flow-through opening, the piston arranged at least partially in the compensating chamber, the piston being actuated by a pressurized medium, the control unit further comprising an aneroid chamber, said aneroid chamber being mounted in the cup-shaped housing and capable of being charged with a pressurized medium, the aneroid chamber being delimited by a first ring diaphragm, said first ring diaphragm being resilient and sealing off said piston and said aneroid chamber from said housing.

2. The bearing according to claim 1, wherein:
   the piston is sealingly surrounded in at least one partial area of its axial extent by at least one annular push-action spring of an elastic material, and said push-action spring is braced against an abutment, which is fixed in relation to the housing.

3. The bearing diaphragm according to claim 2, wherein:
   the piston is surrounded in a fluid-tight manner by a roller diaphragm with a bulb; and
   the roller diaphragm, the bulb, and the push-action spring are formed in one piece.

4. The bearing according to claim 3, wherein:
   the roller diaphragm is reinforced with fabric.

5. The bearing according to claim 4, wherein:
   the push-action spring is reinforced with fabric.

6. The bearing according to claim 2, wherein:
   the push-action spring is reinforced with fabric.

7. The bearing according to claim 1, wherein:
   the aneroid chamber is provided with a pneumatic connection.

8. The bearing according to claim 1, wherein:
   the aneroid chamber is able to be charged with a pressure greater than atmospheric.

9. The bearing according to claim 1, wherein:
   the aneroid chamber is able to be charged with a partial vacuum.

10. The bearing according to claim 1, further comprising:
    stop buffers to limit extreme deflections of the piston in relation to the housing.

11. The bearing according to claim 1, wherein:
    the aneroid chamber is provided with at least one vent port that is open to the atmosphere.

12. A switchable bearing comprising:
    a cup-shaped housing;
    an annular spring element of an elastomeric material sealing said cup-shaped housing;
    a separating wall between the spring element and the housing, said separating wall having at least one flow-through opening, said separating wall and said spring element delimiting a working chamber, said separating wall and said cup-shaped housing delimiting a compensating chamber, the working chamber and the compensating chamber communicating through the flow-through opening, said working chamber and said compensating chamber being filled with a hydraulic fluid; and
    a control unit, said control unit comprising a piston operative to seal the flow-through opening, the piston arranged at least partially in the compensating chamber, the piston being actuated by a pressurized medium, the control unit further comprising an aneroid chamber, said aneroid chamber being mounted in the cup-shaped housing and capable of being charged with a pressurized medium, the aneroid chamber being delimited by a first ring diaphragm, said first ring diaphragm being resilient and sealing off said piston and said aneroid chamber from said housing, said piston being surrounded in a fluid-tight manner by a second ring diaphragm, said second ring diaphragm being a roller diaphragm and which, together with said separating wall, delimits the compensating chamber, said separating wall comprising two parts and having perforations said separating wall surrounding an annular membrane only in the area of the perforations.

13. A switchable bearing comprising:
    a cup-shaped housing;
    an annular spring element of an elastomeric material sealing said cup-shaped housing;
    a separating wall between the spring element and the housing, said separating wall having at least one flow-through opening, said separating wall and said spring element delimiting a working chamber, said separating wall and said cup-shaped housing delimiting a compensating chamber, the working chamber and the compensating chamber communicating through the flow-through opening, said working chamber and said compensating chamber being filled with a hydraulic fluid; and a control unit, said control unit comprising a piston operative to seal the flow-through opening, the piston arranged at least partially in the compensating chamber, the piston being actuated by a pressurized medium, the control unit further comprising an aneroid chamber, said aneroid chamber being mounted in the cup-shaped housing and capable of being charged with a pressurized medium, the aneroid chamber being delimited by a first ring diaphragm, said first ring diaphragm being resilient and sealing off said piston and said aneroid chamber from said housing, said piston being surrounded in a fluid-tight manner by a second ring diaphragm, said second ring diaphragm being a roller diaphragm which, together with said separating wall, delimits the compensating chamber.

14. The bearing according to claim 13, wherein:
in the vicinity of the piston, the roller diaphragm has a bulb premolded in one piece, and the bulb can be forced to engage the flow-through opening of the separating wall.

15. The bearing according to claim 13, wherein:
the separating wall delimits an annular damping duct.

* * * * *